(12) United States Patent
Kling et al.

(10) Patent No.: US 8,665,757 B2
(45) Date of Patent: Mar. 4, 2014

(54) METHOD AND NODE FOR FINDING CONTENT IN A CONTENT DISTRIBUTION NETWORK, AND METHOD FOR CREATING A VIRTUAL REPRESENTATION OF A CONTENT DISTRIBUTION NETWORK

(75) Inventors: Lars-Örjan Kling, Södertälje (SE);
Kjell Nyström, Tråangsund (SE);
Thomas Johansson, Haninge (SE);
Stefan Hellkvist, Stockholm (SE);
Hareesh Puthalath, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 81 days.

(21) Appl. No.: 13/375,044

(22) PCT Filed: Jun. 3, 2009

(86) PCT No.: PCT/SE2009/050650
§ 371 (c)(1),
(2), (4) Date: Nov. 29, 2011

(87) PCT Pub. No.: WO2010/140935
PCT Pub. Date: Dec. 9, 2010

(65) Prior Publication Data
US 2012/0076052 A1 Mar. 29, 2012

(51) Int. Cl.
*H04L 12/28* (2006.01)
(52) U.S. Cl.
USPC ............................ 370/256; 370/238; 709/241
(58) Field of Classification Search
USPC ................ 370/238, 238.1, 255, 256; 709/241
See application file for complete search history.

(56) References Cited

U.S. PATENT DOCUMENTS

| | | | |
|---|---|---|---|
| 6,088,333 A * | 7/2000 | Yang et al. ..................... | 370/238 |
| 2005/0144317 A1 | 6/2005 | Chase et al. | |
| 2005/0152284 A1 | 7/2005 | Kotha et al. | |
| 2006/0056411 A1* | 3/2006 | Badat et al. ................... | 370/392 |
| 2008/0313350 A1 | 12/2008 | Swinton et al. | |
| 2009/0172191 A1* | 7/2009 | Dumitriu et al. .............. | 709/241 |
| 2010/0287207 A1* | 11/2010 | Motoyama .................... | 707/803 |

FOREIGN PATENT DOCUMENTS

WO    WO 2005/099223 A1    10/2005

OTHER PUBLICATIONS

Fielding, et al:"Hypertext Transfer Protocol—HTTP/1.1". Network Working Group, Request for Comments: 2616. Jun. 1999.

* cited by examiner

Primary Examiner — Anh-Vu Ly
Assistant Examiner — Hashim Bhatti (57) ABSTRACT

Embodiments of the present invention a method and a node for finding the shortest path to a cache node in a content delivery network (CDN) comprising requested content and a method for creating a virtual representation of a network. According to an embodiment of the present invention, the virtual representation is in the form of a virtual, hierarchical topology, and the cache nodes correspond to the cache nodes of the real network. All cache nodes are arranged at a first level and with the virtual nodes arranged at higher levels. In the virtual representation, all nodes (cache and virtual) are connected with virtual links such that there exist only one path between any two arbitrary cache nodes. Further, costs to the virtual links are assigned such that the path cost between any two arbitrary cache nodes in the virtual representation generally corresponds to the lowest path cost between corresponding cache nodes in the real network.

21 Claims, 7 Drawing Sheets

METHOD AND NODE FOR FINDING CONTENT IN A CONTENT DISTRIBUTION NETWORK, AND METHOD FOR CREATING A VIRTUAL REPRESENTATION OF A CONTENT DISTRIBUTION NETWORK

TECHNICAL FIELD

The present invention relates generally to communications networks, and in particular, to a method and node for finding the shortest path to cache node comprising requested content and a method for creating a virtual representation of a network.

BACKGROUND

Content delivery networks (CDNs) or content distribution networks provide a caching infrastructure in IP networks to support multimedia services. A CDN performs a set of functions that handles things like placement of content into cache nodes, i.e. nodes that cache content, in the CDN, redirecting client requests to the most optimal cache node, keeping track of usage statistics and also replicating or moving content based on popularity in certain regions of the network. The mechanism to redirect clients to a cache node differs between different CDN implementations. Some use specially crafted DNS servers to direct users to the node caching the requested content and others use Hypertext Transfer Protocol (HTTP) or Real Time Streaming Protocol (RTSP) redirection to direct client requests to the node caching the requested content.

Figure 1:
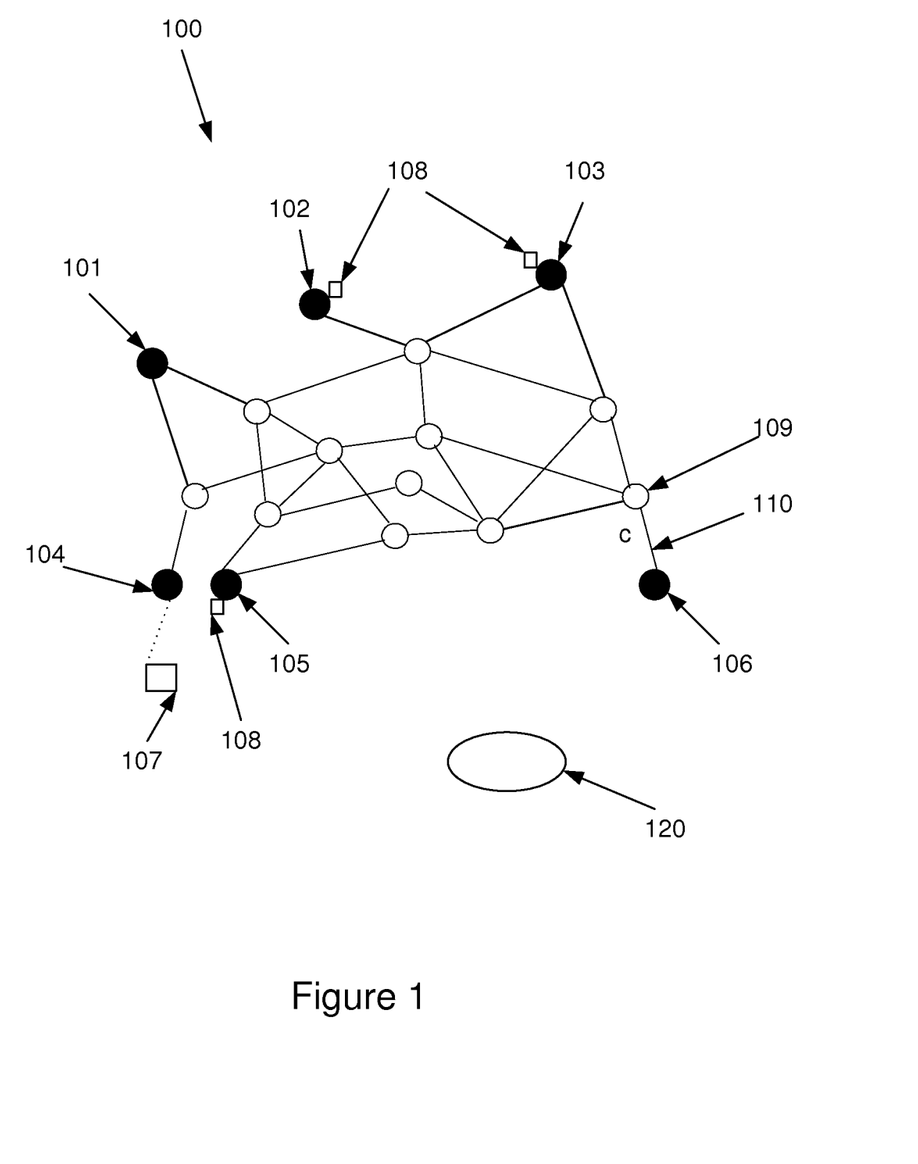
FIG. 1 illustrates a schematic diagram of content delivery network.

FIG. 1 schematically illustrates an example of a CDN 100. The network comprises a number of cache nodes, also called edge nodes 101-106 represented by filled circles wherein content, e.g. data files are cached only on edge nodes. In this example an end user computer 107, also called client, is connected to only one edge node 104. In this example one specific data file 108 is stored in two edge nodes 102, 103. The non-filled circles represent intermediate nodes 109 in the network that connects the edge nodes to each other. The lines between the circles represent links 110 between the nodes. The intermediate nodes 109 are e.g. routers and switches. Each link represents a communication cost, indicated by the letter "c". The cost for different links can vary significantly depending on e.g. the connection and the distance between the nodes. For the sake of clarity the reference numerals c, 109 and 110 are only shown once in the figure.

A problem with a network as described above is to localize the "closest" cache node on which a copy of a requested data file is stored. In this case, "closest" means the cache node with the lowest path cost from the cache node to which the client is connected. The cost is a measure of the communication cost, and may include e.g. capacity, bandwidth constrains, jitter, delay, and average packet loss rate.

The problem of finding the closest cache node comprising a requested content can be solved for the real network model shown above. However, the algorithms are complex due to the multiple paths between cache nodes. Usually methods for finding a closest cache node is performed by a location server 120 (FIG. 1), also called locator node, upon receipt of a request from a cache node. Some examples of such methods are described below:

i) Each locator node serves requests from any cache node for any content. The locator node has information including: a distance table, which is a table comprising a matrix of entries each holding the distance between all pairs of cache nodes; and a content table, which is table of entries each holding the list of cache nodes caching the content. The distance is equivalent to the communication cost and the distance table can thus also be called cost table table. When receiving a request, the locator looks up the list of cache nodes caching the content in the content table. For each entry in the list, the distance between the requesting site and the hosting site is looked up in the distance table and the least distance site so far is remembered. Finally, the cache node having the shortest distance is determined and returned.

ii) Each locator node serves requests from any cache node for a subset of content. The distance table and content table are as in method i) above, but the content table only holds entries for the content served by the specific locator node. A request must first be redirected to the locator node serving the requested content. Once received, the appropriate locator node determines the best cache node as in the previous method i).

iii) A set of locator nodes serve requests from a specific cache node for any content. The locator node includes a content table as in method i) above, but the entries hold an ordered list of cache nodes. The ordering is obtained by pre-computing the distance from the served cache node to the different cache nodes caching a requested content and ordering the cache nodes accordingly. Non optimal cache nodes should be retained in the list in order to be able to update the list when a cache node caching the content is removed or added. A request is always served by a closest (local) locator node. Once a request is received, the locator node immediately looks up the first entry in the list of cache nodes hosting the content in the content table and returns it as the best cache node.

In the above described methods i) and ii) the needed storage capacity is proportional to the square number of cache nodes times the number of cached copies of content and in method iii) proportional to the number of cache nodes times the number of cached copies of content. In large networks this requires large memory capability in the locator node.

Further, the methods described above require significant processing capability.

SUMMARY

An object of the present invention is therefore to provide a method and node that at least in part solves the above mentioned problems and more efficiently uses the resources of a locator node.

According to an embodiment of the present invention a method for finding content in a network comprising a plurality of cache nodes comprising cached content and a plurality of intermediate nodes is provided. The method is performed in a cache finding entity, preferably a locator node. The method includes the step of implementing a virtual representation of the network. The virtual representation is in the form of a virtual, hierarchical topology, where the cache nodes correspond to the cache nodes of the real network. All cache nodes are arranged at a first level and with the virtual nodes arranged at higher levels. In the virtual representation, all nodes (cache and virtual) are connected with virtual links such that there exist only one path between any two arbitrary cache nodes. Further, costs to the virtual links are assigned such that the path cost between any two arbitrary cache nodes in the virtual representation generally corresponds to the lowest path cost between corresponding cache nodes in the real network. The method further includes the steps of receiving a request for specific content and identifying a plurality of cache nodes in the network comprising the requested content. The implemented virtual representation is then used for finding the closest cache node comprising the requested content.

An advantage with this method is that e.g. localizing and allocating content in a CDN can be made much less costly with respect to computing resources like processing time and memory. For example, the needed storage capacity will be proportional to the number of cache nodes instead of being proportional to the number of cached copies of content.

In another embodiment, the present invention is directed to a method in a management node for creating a virtual representation of a real network, preferably a CDN. The network comprising a plurality of cache nodes comprising cached content and a plurality of intermediate nodes. The method begins with receiving a table having entries comprising information regarding costs between the plurality of cache nodes included in the network. Thereafter a virtual topology of the network is created where the virtual topology is hierarchical and where the cache nodes correspond to the cache nodes of the real network. All cache nodes are arranged at a first level and with the virtual nodes arranged at higher levels. In the virtual representation, all nodes (cache and virtual) are connected with virtual links such that there exist only one path between any two arbitrary cache nodes. Further, costs to the virtual links are assigned such that the path cost between any two arbitrary cache nodes in the virtual representation generally corresponds to the lowest path cost between corresponding cache nodes in the real network.

An advantage with this method is that e.g. localizing and allocating content in a CDN can be made much less costly, by a cache finding entity, with respect to computing resources like processing time and memory. For example, the needed storage capacity in the cache finding entity will be proportional to the number of cache nodes instead of being proportional to the number of cached copies of content.

In yet another embodiment, the present invention is directed to a node for finding content in a network. The network comprising a plurality of cache nodes comprising cached content and a plurality of intermediate nodes. The node includes means for implementing a virtual representation of the network. The virtual representation is in the form of a virtual, hierarchical topology, where the cache nodes correspond to the cache nodes of the real network. All cache nodes are arranged at a first level and with the virtual nodes arranged at higher levels. In the virtual representation, all nodes (cache and virtual) are connected with virtual links such that there exist only one path between any two arbitrary cache nodes. Further, costs to the virtual links are assigned such that the path cost between any two arbitrary cache nodes in the virtual representation generally corresponds to the lowest path cost between corresponding cache nodes in the real network. The node further includes a memory in which the virtual representation may be implemented, a receiver for receiving a request for a specific content, and identifying means for identifying a plurality of cache nodes in the network that comprises the requested content. Included in the node is also a central processing unit configured to use the virtual representation for finding the closest cache node comprising the requested content.

An advantage with such a node compared to known nodes is that computing resources like processing time and memory are less loaded when used for localizing and allocating content in a CDN.

BRIEF DESCRIPTION OF THE DRAWINGS

Reference will now be made, by way of example, to the accompanying drawings, in which.

DETAILED DESCRIPTION

Figure 2:
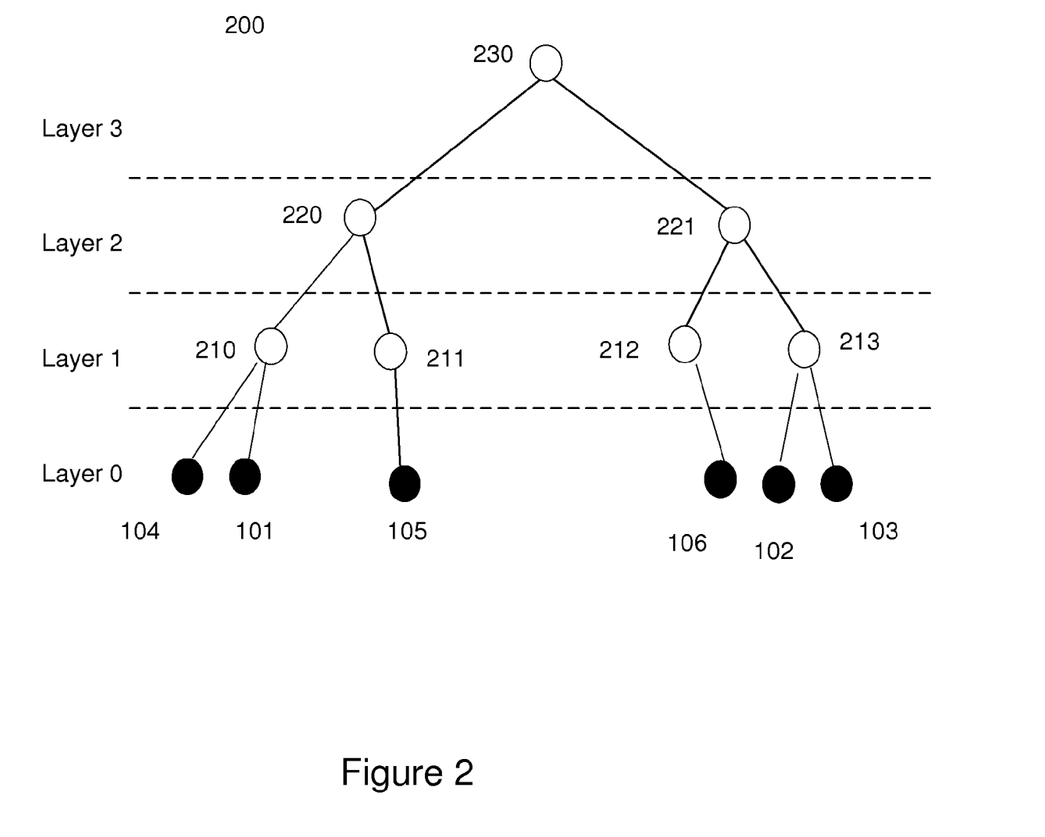
FIG. 2 schematically illustrates a virtual representation of the content delivery network illustrated in FIG. 1, in accordance with an embodiment of the present invention.

FIG. 2 illustrates a virtual representation 200 of a content delivery network in accordance with the present invention. The virtual representation is a transformation of the real network as illustrated in FIG. 1 into a simplified hierarchical network. Where applicable the devices and features that are the same in the figures of the present application will use the same reference numbers. First, all cache nodes 101-106 may be defined and located in the same layer, layer 0. The cache nodes 101-106 remain the same in the virtual representation as in the network 100 in FIG. 1. Usually a network 100 is made up of fictive islands of routers, i.e. intermediate nodes 109, where routers within a fictive island are located close to each other, compared to the distance to other routers in the network, located outside of the island. Such an island would normally correspond to a virtual node 210-213 in the virtual representation, where each cache node 101-106 is connected to one virtual node in layer 1, i.e. one of the virtual nodes 210-213. The virtual nodes 220-221 in layer 2 can be seen as defining a region of islands comprising a number of sub-regions of islands, where each virtual node in layer 1 defines such a sub-region. Layer 3 can be seen as an entire archipelago that is made up of these virtual nodes. Even though the geographical positions could be used as basis for the defining the virtual nodes, it is not a necessity. The virtual nodes 210-213 does not necessarily have an immediate correspondence to the intermediate nodes 109 in real network 100, but a virtual node 210-213 could correspond to one or more intermediate nodes 109. Any virtual node in layer 1 can be connected to any number of cache nodes 101-106 as long as each cache node only is connected to one virtual node 210-213. Further, each virtual node 210-213 in layer 1 may be connected to one virtual node 220-221 in Layer 2, and each virtual node 220-221 in layer 2 may be connected to a virtual node 230 in layer 3, in this example being the root node, etc. Accordingly the virtual nodes in the higher layers 2 and 3 may or may not correspond to one or more intermediate nodes 109. Depending on the size of the network 100, the number of layers in the virtual representation may differ.

Once the network 100 has been transformed to a virtual network 200, virtual links 240 between the nodes in the virtual network 200 will be defined. The links shall connect the nodes such that there exist merely one path between two arbitrary edge nodes. E.g. between cache node 104 and cache node 106, the only existing path is via the virtual nodes 210-220-230-221-212. In order for the virtual representation 200 to be simplified but also a usable representation of the network 100, costs have to be assigned to the defined virtual links such that the path cost between two arbitrary edge nodes generally corresponds to the lowest path cost between corresponding edge nodes in the real network. In the real network, multiple paths between e.g. node 104 and node 106 exist, the paths usually having a varying cost. The path 210-220-230-221-212 would have a cost generally corresponding to the lowest cost between these two nodes 104, 106 in the real network 100. Costs may be assigned to the virtual links such that the difference in cost between any arbitrary cache nodes in the virtual network 200 and in the real network 100 is minimized. One way of doing this is by locating the minima of an error function by gradient search as depicted below.

Each link in the virtual representation has an associated cost: $c_1$. The virtual representation and the costs are assigned in a way such that $$d_{s,t} = \sum_{i \in P(s,t)} c_i + \varepsilon_{s,t}$$

Where
$d_{s,t}$ is the distance (total cost) between cache nodes s and t
$P(s,t)$ is the set of links in the path between s and t in the virtual representation
$\varepsilon_{s,t}$ is an error that should be minimized
The virtual representation itself could be heuristically assigned by using the geographical positions of the cache nodes as indicated above. Once this has been done, the error could be minimized by finding the minima of
$\Sigma \varepsilon_{s,t}^2$
Gradient traversal can be used in the $\langle c_1, c_2, \ldots c_n \rangle$ space and an arbitrary component of $\nabla \cdot \Sigma \varepsilon_{s,t}^2$ in the space spanned by all $\langle c_1, c_2, \ldots c_n \rangle$ can be calculated:

$$\frac{\partial}{\partial c_i} \sum_{\substack{s,t \\ \in S \times S}} \varepsilon_{s,t}^2 = \frac{\partial}{\partial c_i} \sum_{\substack{s,t \\ \in S \times S}} \left( \sum_{j \in P(s,t)} c_j - d_{s,t} \right)^2 =$$

$$\sum_{\substack{s,t \\ \in S \times S}} \frac{\partial}{\partial c_i} \left( \sum_{j \in P(s,t)} c_j - d_{s,t} \right)^2 = = \sum_{\substack{s,t \\ \in S \times S}} \left[ 2 \left( \sum_{j \in P(s,t)} c_j - d_{s,t} \right) \frac{\partial}{\partial c_i} \sum_{j \in P(s,t)} c_j \right] =$$

$$2 \sum_{\substack{s,t \\ \in S \times S}} [-\varepsilon_{s,t} \text{true}(i \in P(s,t))] = = -2 \sum_{\{s,t | i \in P(s,t)\}} \varepsilon_{s,t}$$

An updating algorithm can be as follows:
Choose a start speed $\zeta$ for the gradient traversal
  Repeat for decreased speed $\zeta$
  For each pair of cache nodes s,t
    Traverse the path between s,t and sum the costs on the path to obtain $$c_{s,t} = \sum_{i \in P(s,t)} c_i$$

Calculate and remember the error $\varepsilon_{s,t} = d_{s,t} - c_{s,t}$
  Done
  For each pair of cache nodes s,t
    Recall the error $\varepsilon_{s,t}$
    Traverse the path between s,t and add a $2\zeta \varepsilon_{s,t}$ to each cost on the path
  Done
Done In other words, the difference between assigned costs in the virtual representation between any two cache nodes and the lowest path cost between corresponding any two cache nodes in the real network can be minimized by performing the following steps for each pair of cache nodes: (a) summing the cost for all virtual links connecting two cache nodes to receive a summed path cost between the two cache nodes; (b) calculate the difference between the summed path cost and the lowest path cost between the two cache nodes; and thereafter (i) summing the difference of all path costs using a least squares method; (ii) locating the minima to the difference of all path costs using a gradient search; and (iii) adding a value to the cost for each virtual link connecting nodes in the virtual representation, based on the calculated minima.

Figure 3:
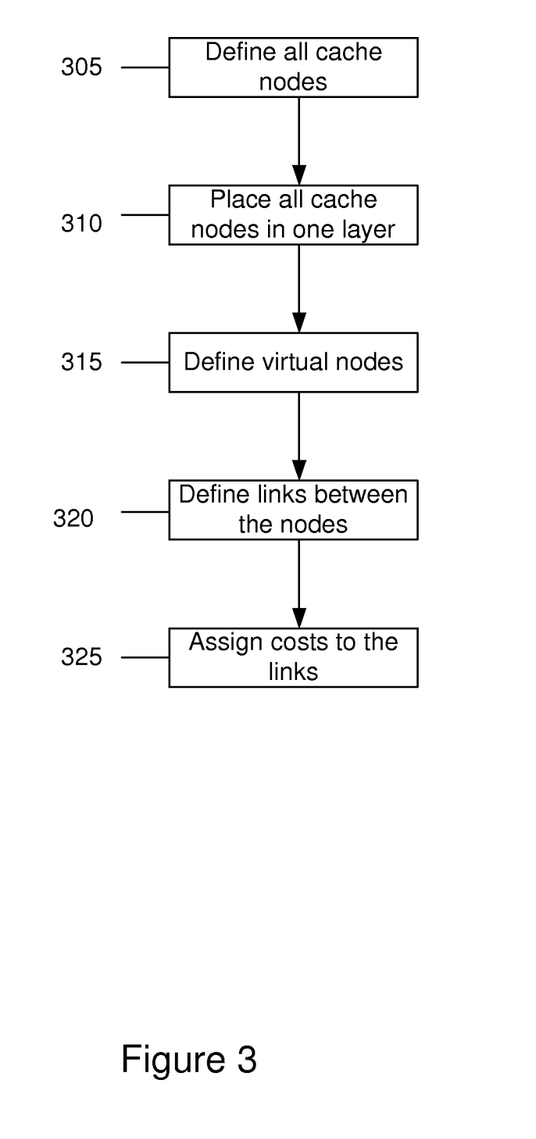
FIG. 3 schematically illustrates a block diagram describing steps for achieving the virtual representation as shown in FIG. 2; in accordance with an embodiment of the present invention.
Figure 4:
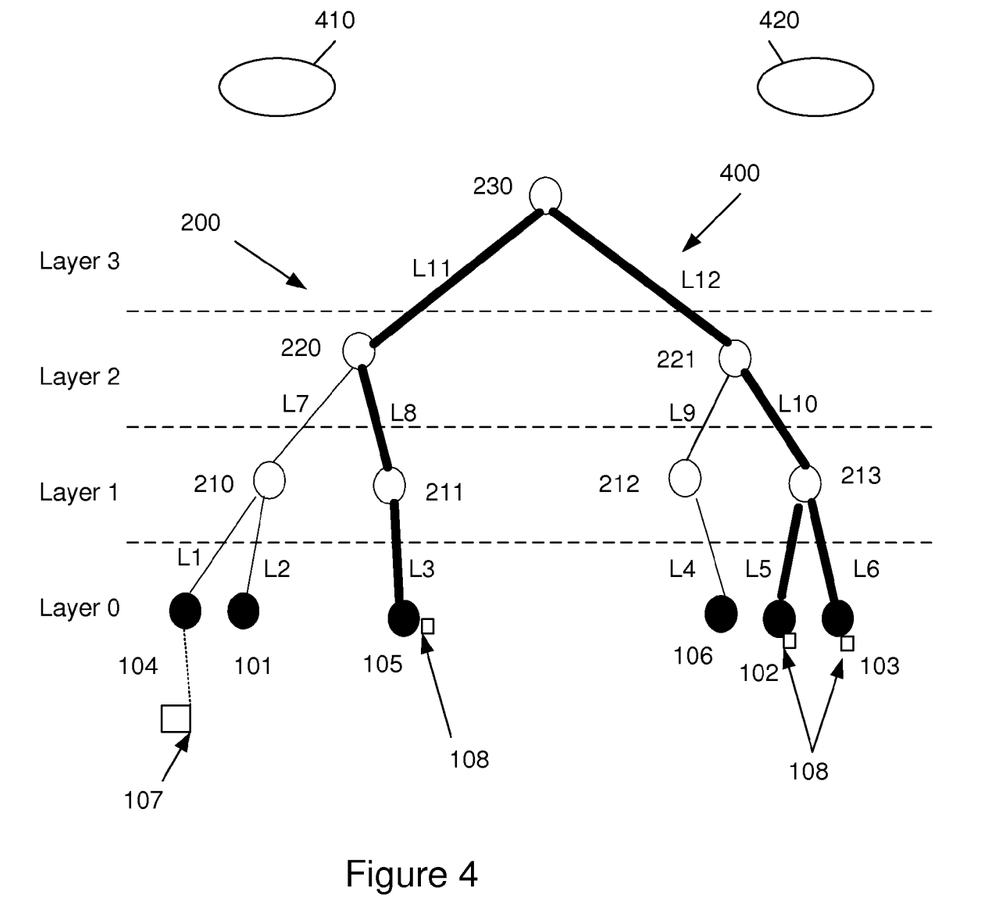
FIG. 4 schematically illustrates a virtual representation of a content delivery network including a sub-tree emphasizing links between cache nodes containing requested content; in accordance with an embodiment of the present invention.

FIG. 3 is a flow chart describing a method for achieving a virtual representation 200 of a real network 100 according to an embodiment of the present invention. In step 305 all cache nodes 101-106 to be included in the virtual representation are defined and in step 310 these cache nodes 101-106 are placed in a first layer. All cache nodes 101-106 may preferably be placed in the same layer. In step 315 virtual nodes are defined and placed in second and eventually subsequent layers. It should be noted that even though the present application talks about the cache nodes 101-106 being placed in a lowest layer and the virtual nodes being placed in higher layers, the opposite is of course equally applicable. Once the virtual nodes have been defined, links between the virtual nodes and between the virtual nodes and the cache nodes will be defined in step 320. It should however be noted that all virtual nodes in step 315 must not be defined before the virtual links are defined in step 320. Instead, preferably some of the virtual nodes in layer 1 may be performed in a first step 315 by locating the routers and cache nodes being close to each other and thereby at the same time defining the links between these virtual nodes and the cache nodes according to step 320. Thereafter, further virtual nodes may be defined (again, step 315) and linked (step 320) to cache nodes in layer 0 or to the previously defined virtual nodes in layer 1—and thus be positioned in layer 2. I.e. steps 315 and 320 may be iterated until the entire virtual representation comprising virtual nodes and virtual links is achieved. In step 325 the cost for these links will be assigned, e.g. as previously described above. The virtual representation 200 of the real network 100 may be performed in a management node 420 (FIG. 4). The management node 420 may be a separate entity in the network but may also e.g. be a part of a locator node 410. The management nodes may periodically send updates of the virtual representation to the locator node where it will be implemented. As an alternative the locator node may request the virtual representation from the management node when necessary. The virtual nodes may include entries in a table such as node identification (id number or similar), a pointer to nodes in lower layers and the cost for going to a virtual node in a higher layer. Dependent on the detailed algorithm, an entry may hold the root-path branch indices from the root node 230 to lower cache nodes or just immediate pointers (or indexes) to the cache nodes.

According to an embodiment of the present invention, the steps of transforming the network 100 into a virtual topology may be performed by consulting databases containing the information needed. The needed information includes the cache nodes, e.g. number identification, that are present in the network and the distances, or more precisely the communication costs, between these cache nodes. The management node 420 thus preferably receives a table having entries comprising information regarding costs between the cache nodes. When creating the virtual representation this may, according to an embodiment of the invention, be done by merely using information of the cache nodes and said costs by eliminating all intermediate nodes and re-organizing the structure of the real network comprising multiple paths between all cache nodes into an hierarchical topology where it only exist one path between any two cache nodes and this path being as equal as possible to the lowest path cost between these two nodes. If the cost between two cache nodes in the virtual representation does not generally correspond to the lowest cost between the same cache nodes in the real network, the error will be minimized e.g. as described above. However, if the optimization can not be satisfactorily performed in the virtual topology, the virtual topology may have to be slightly adjusted, e.g. by increasing the height of the virtual tree by inserting further layers, and then re-assigning the costs to the links so that a better correspondence can be achieved. Since the virtual representation is mainly thought of to be used to find the closest cache node comprising certain content, it is not necessary that the costs in the real network correspond to the costs in the virtual representation in an exact manner. A certain amount of error is acceptable. The worst case would be that a cache node having a certain cost in the virtual representation would be chosen as the closest cache node over a cache node that in the real network has a lower cost than the chosen cache node, but in the virtual representation has a higher cost. As long as the error is within a certain amount this is acceptable, since the increase in communication cost for retrieving the content would thus be quite small.

Figure 7:
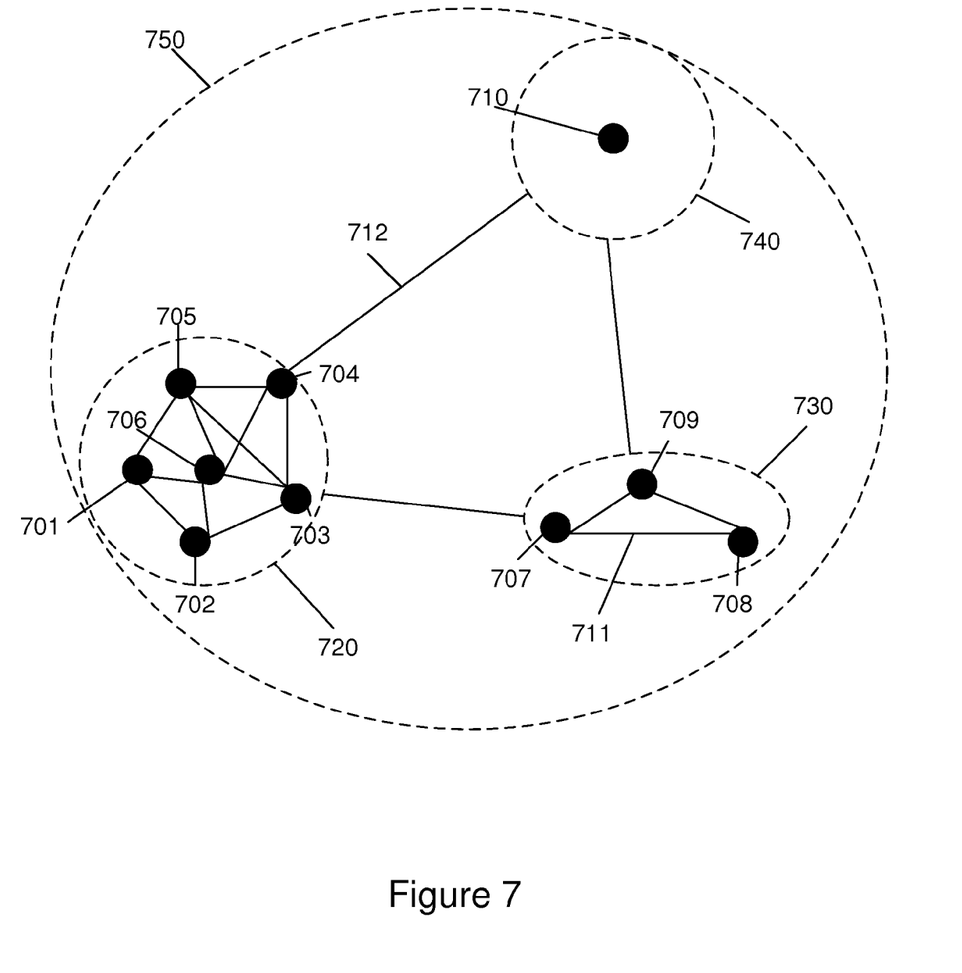
FIG. 7 illustrates a network where virtual nodes have been defined in accordance with the present invention.

FIG. 7 illustrates a network comprising a plurality of cache nodes 701-710 where virtual nodes 720, 730, 740 have been defined. The virtual node 720 logically represents a set of cache nodes 701-706, virtual node 730 represents cache nodes 707-709 and finally virtual node 740 represents cache node 710. Virtual node 750 represents the three virtual nodes 720, 730 and 740. All cache nodes 701-710 have a lowest path cost between each other and all cache nodes are connected by links 711, 712. Within the virtual node 720 the pair of cache nodes having the highest lowest path cost have a lowest path cost that is below the value that is set as a criteria to be included in the virtual node 720. As an alternative the virtual nodes can be defined manually, e.g. based on regions and/or geographical proximity. The intra links 711 within the virtual nodes are preferably low cost links, whereas the inter links 712 between the defined virtual nodes preferably are high cost links. However, the virtual nodes 720, 730, 740 may be more sensitively defined, whereby the cost for the links 712 would merely be slightly larger than the cost for the links 711. Virtual node 750 may be defined in a similar manner based on the path cost for the links 712 between the virtual nodes 720, 730 and 740. All virtual nodes having an inter link 712 cost being lower than a certain value (presumably much higher than the inter link 711 cost) may be included in a further virtual node 750, which can be seen as a virtual node arranged in a higher layer. This may continue with further virtual nodes being arranged in higher layers until a tree structure with virtual nodes are arranged in upper layers and with the cache nodes being arranged in the lowest layer. When determining the cost for the links 712 between a first and a second virtual node this may e.g. be done by choosing the cost between an arbitrary cache node in the first virtual node and an arbitrary cache node in the second virtual node. Another alternative is choosing the lowest cost between cache nodes in the first virtual node and cache nodes in the second virtual node. A further alternative is determining a mean distance between cache nodes in a first virtual node and cache nodes in a second virtual node. The same method may be applied for determining costs between virtual nodes in higher layers.

FIG. 4 illustrates a virtual representation of a content delivery network including a sub-tree 400, the sub-tree 400 being shown with thick links between the included nodes. The sub-tree 400 spans a tree comprising only cache nodes 102, 103, 105 containing a particular content and the paths between these cache nodes, i.e. all cache nodes 101, 104, 106 not comprising the particular content are pruned from the sub-tree 400. The sub-tree 400 is preferably created and/or implemented in a locator node 410. Preferably sub-trees for all content being cached in any of the cache nodes included in the network are created in one or more locator nodes 410. Whenever a particular content is added or deleted from a cache node in the network, the sub-tree is preferably amended accordingly. A locator node 410 is a node that upon request for a particular piece of content can redirect to the appropriate cache node that has that piece of content and return the address of that cache node as a redirect reply. The locator node may also take on the role of an allocator node and may then determine in which cache nodes to place and migrate content by using different statistics. In a CDN there may be a plurality of locator nodes 410 containing information of different categories of content. A first locator node may for e.g. contain information of in which cache nodes movies are cached, whereas a second locator node may contain information of in which cache nodes games are cached, etc. The locator node 410 may receive the virtual representation 200 of the network 100 from a management node 420 or similar performing the steps described with reference to FIG. 3.

Figure 5:
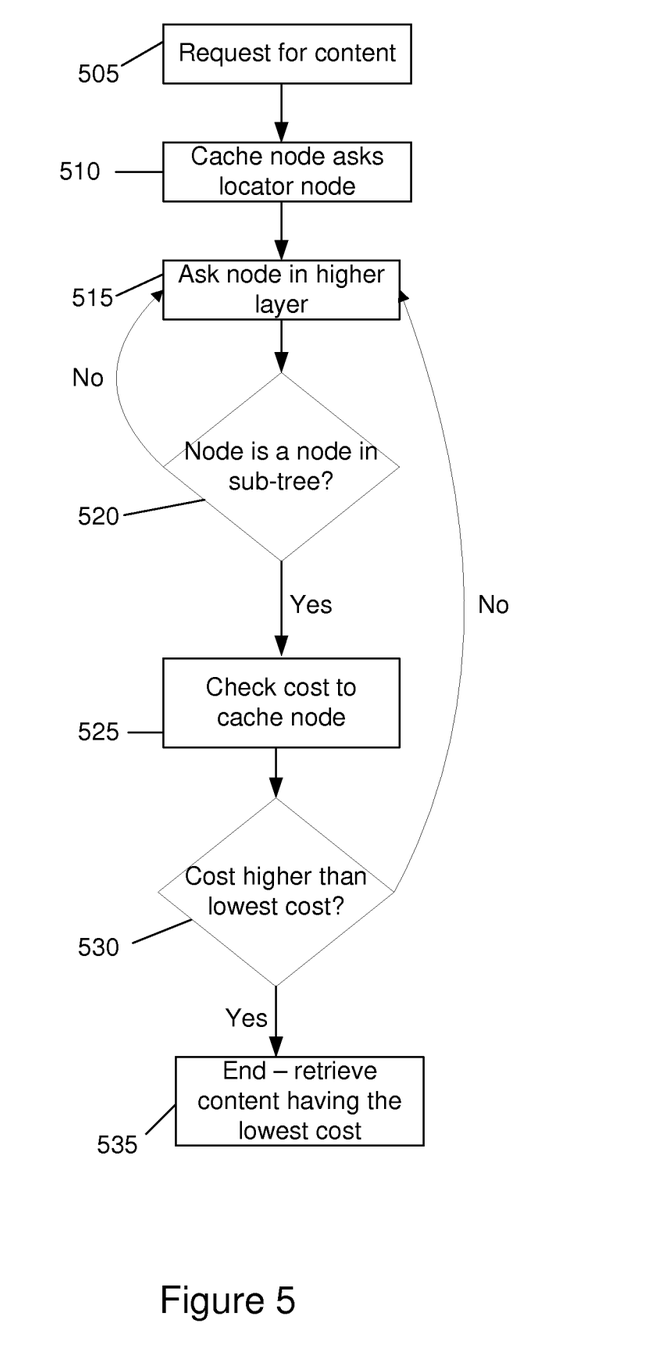
FIG. 5 schematically illustrates a method for finding the shortest path to a cache node containing requested content, in the form of a flow chart according to an embodiment of the present invention.

FIG. 5 is a flow chart describing a method to find the shortest path to a cache node containing requested content according to an embodiment of the present invention.

With reference to FIGS. 4 and 5 a method according to an embodiment of the present invention for finding the shortest path to a cache node containing requested content will be described. A client 107 connected to a cache node 104 sends out a request for a specific content 108 according to step 505. If the cache node 104 does not have the requested content, the cache node 104 forwards the request to a locator node 410 according to step 510. An alternative is that the client sends a request directly to the locator node 410, thus skipping step 510. The locator node 410 preferably already has an implemented version of the virtual representation 200 of the network and if the requested content can be found in any cache node in the network, the locator node preferably also has an implemented version of the sub-tree 400 for the requested content. As an alternative the virtual representation 200 may be fetched from a management node 420 when the locator node 410 receives the request for content and/or the sub-tree 400 may be implemented upon receiving the request. If only one cache node comprising the requested content is found there may not be any sub-tree or a sub-tree may not have to be created, but the requested content can instead be fetched directly. If a sub-tree is created despite only one cache node being found it may include one path from the cache node to the root node. Further, if all cache nodes comprising the requested content are positioned on the same side of the root node in the virtual representation, the sub-tree may include paths from a root node to each of the cache nodes comprising the requested content and not just between these cache nodes. During the creation of the sub-tree 400, entries will be added, preferably by the locator node 410, to the affected virtual nodes 211, 213, 220, 221 and 230 in the network 200. These entries may e.g. include information clarifying that the node is a part of the sub-tree as well as the cost for retrieving the requested content from a descending cache node. Preferably each virtual node 211, 213, 220, 221, 230 in the sub-tree 400 will also include an entry in a table pointing out the path having the lowest cost to a cache node comprising the requested content and an entry directly pointing out the corresponding cache node and the associated cost. For example, the virtual node 211 may include a pointer to the cache node 105 as well as the communication cost for the link L3. Accordingly the virtual node 220 may include a pointer to the cache node 105 as well as the total communication cost for the links L3 plus L8. The root node 230 may include a pointer to the cache node 102, 103 or 105 having the lowest total path cost from the root node as well as the size of this cost. In order to find out the cost for the descending path from e.g. the virtual node 220 to the cache node 105 the sub-tree 400 may be traversed bottom-up from the cache node 105 to the virtual node 220 or in the opposite direction from the virtual node 220 to the cache node 105. However, in the latter example; if a plurality of cache nodes comprising the requested content can be found below a virtual node this traversal may have to be performed for each path between the virtual node and the cache nodes.

Since the requested content was not present in the cache node 104 according to step 510, the scheme continues with step 515 by asking a node in a higher layer if he is a member of the sub-tree. In this example it is the virtual node 210 that is closest to the cache node 104 that sent out the request and accordingly, in step 520, checks whether he is a part of the sub-tree 400 or not. If the answer is no, the scheme returns to step 515 where the virtual node 210 forwards the request to a virtual node 220 located in a higher layer. Steps 515 and 520 are repeated until a virtual node being part of the sub-tree 400 is found. The virtual node may then return which cache node that comprises the content and the cost for retrieving the content. Once such a virtual node 220 is found a first cache node 105 comprising the requested content may be identified in step 525. The cost for fetching the content from cache node 105 is at the same time preferably noted in the locator node 410 together with the identity of the cache node 105. The cost may include the sum of the costs for the links L1-L7-L8-L3.

The scheme could very well end the first time the scheme arrives in step 525; however, it may still be the case that the specific content 108 may be fetched from another cache node at a lower cost. The scheme may thus continue with step 530, however, the first time the scheme arrives in step 530 no previous cost for retrieving the requested content will be noted and therefore the scheme automatically returns to step 515. As an alternative an initial infinite value of the cost could be set so that the first cost always is below this value. In step 515 the virtual node 220 forwards the request to a virtual node 230 located in an even higher layer. In this example the virtual node 230 is a root node, whereby no nodes in even higher layers should be asked. Step 520 should therefore preferably include a root node check so that the scheme does not return to step 515 any more. Since the node 230 is a part of the sub-tree 400, the scheme may continue with step 525 where the lowest cost to a further cache node 102, 103 comprising the content is checked. However, if no information of further cache nodes comprising the content 108 is present in the virtual node, i.e. if the virtual node would be located on a single path between a root node and a virtual node—also located in the sub-tree 400, the cost would merely be accumulated. In step 530 the total cost for retrieving content 108 from any further cache node or the accumulated cost is checked and compared to the lowest found cost for fetching the content 108. If the cost for fetching the content 108 from the cache nodes 102 or 103 is lower than the cost for fetching the content 108 from cache node 105, i.e. if the cost for the links L11-L12-L10-L5 or L11-L12-L10-L5 is lower than L8-L3, the content 108 may be fetched from the cache node 102 or cache node 103 having the lowest cost. The virtual node 230 may only keep information regarding retrieval cost for the cache node 102, 103 or 105 comprising the content 108 and having the lowest cost. So in this example node 230 would only return the cost of retrieving either from cache node 102, 103 or 105. Further in step 530, if there still are virtual nodes in upper layers and the accumulated cost is lower than the lowest cost for fetching the requested content noted by the locator node 410, the scheme continue by repeating step 515 etc, until it is clear that the cache node having the lowest cost has been found, whereby the scheme ends in step 535 and the requested content 108 may be fetched. The locator may then send information to the cache node causing the content to be retrieved and/or cached in the cache node. It should be noted that since the root node preferably always in included in the sub-tree 400, step 520 may only be necessary until a first virtual node being part of the sub-tree is found; i.e. until the first time step 520 is exited according to alternative "yes".

According to an embodiment of the invention functionality for defining the virtual nodes 210, 211, 212, 213 in layer 1 as logically representing a set of descending cache nodes 101-106 can also be present in the locator node 410. E.g. virtual node 210 can be seen as logically representing cache nodes 104 and 101. Which cache nodes to be logically represented by a virtual node can be determined by the communication cost between the cache nodes, e.g. all cache nodes that have a cost between them being lower than a certain value. In this way the virtual node 210 is able to collect statistics regarding requests for specific content in each of the content cache nodes 101, 104 represented by the virtual node 210 and further to determine, based on the statistics gathered from all content cache nodes 101, 104 represented by the virtual node 210, whether the content should be cached in any of the cache nodes 101, 104 represented by the virtual node or not. E.g. the first time content is requested by the cache node 104 it may not be desirable to cache the content, but instead to wait and make a decision based on statistics gathered over a period of time or to cache the content in another cache node 101 represented by the virtual node. By keeping the statistics in the virtual node an optimal distribution of the content can thus be achieved since the virtual node can selectively cache content for which it perceives a high demand when the content requests from all the included cache nodes 101, 104 are summed up, but a low demand from the cache nodes 101, 104 when seen as single entities. The virtual node may thus have entries including the cache nodes that it represents, the content that is cached in the cache nodes and statistics regarding requests for content, as well as other statistics such as cost for retrieving content. Further, the virtual nodes in higher layers (layer 2 and up) can be defined as representing a plurality of virtual nodes in lower layers.

An exemplary overview of the data held in a virtual node can be as follows:

Record identification (associative):
  NodeId: Unique identity of a virtual node in the network.
Tree structure:
  Parent NodeId: The identity of the closest virtual node in a higher layer
  Children NodeIds: An ordered set (sequence) of identities of virtual nodes in lower layers
Distance information:
  Parent edge cost: The cost for communication on the link to the closest virtual node in a higher layer MeanDistanceBelow: The mean cost to the cache nodes below the node Statistics information:
Boxes: A (circular) array of boxes. Each box contains a set of content and a counter of the number of content in the box. The sets are implemented by head and tail pointers to a list of content records.
BoxClk: The current clock for the node. Counts modulo the size of the box array.

For each piece of content the virtual node may e.g. be complemented with the following, i.e. the sub-tree may include the following data:

Record identification (associative):
ContentId: unique identity of a particular piece of content, and Copy search information:
CopyExistBelow: A Boolean telling the existence of at least one copy below in the sub-tree.
BestNodeBelow: Optional identity of the closest cache node below in the sub-tree holding a copy.

Figure 6:
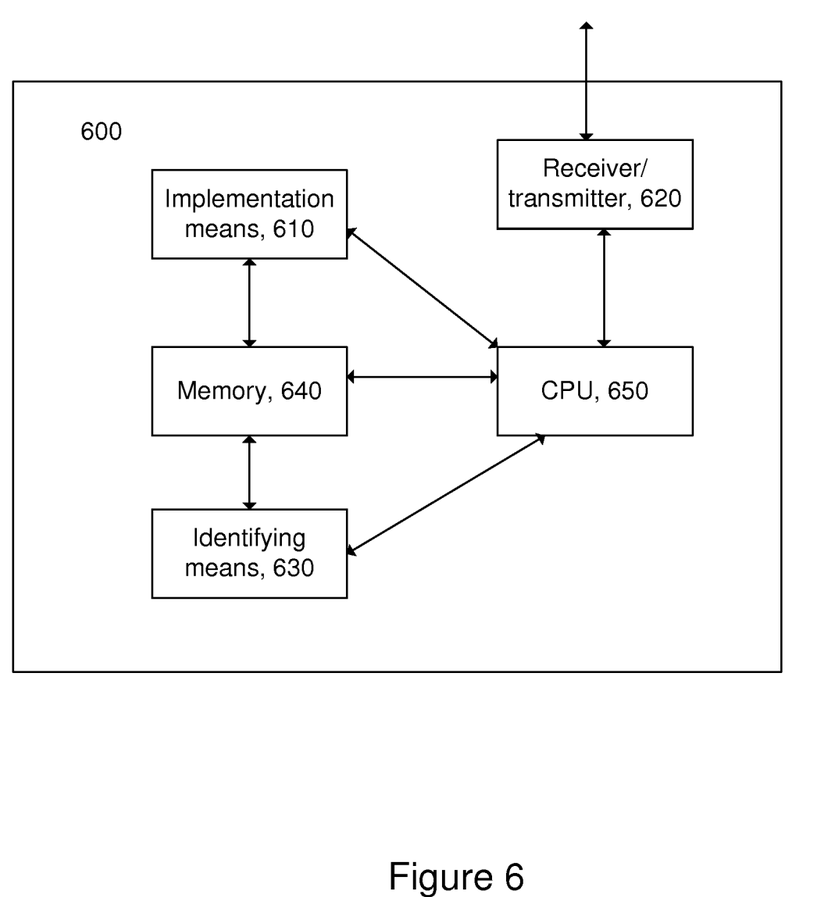
FIG. 6 schematically illustrates a locator node according to an embodiment of the present invention.

FIG. 6 schematically illustrates a cache finding entity 600, which preferably is a locator node, according to an embodiment of the present invention. The locator node 600 includes means 610 for implementing a virtual representation 200 of the network 100, as well as for implementing a sub-tree 400 in the virtual representation 200, in accordance with embodiments of the present invention. The locator node 600 further includes a receiver 620 for receiving content requests from cache nodes in the network and means 630 for identifying cache nodes in the network comprising requested content, e.g. by checking a content table included in memory 640. A central processing unit (CPU) 650 is included for, among other things, using the implemented virtual representation to find the closest cache node comprising a requested content and for finding a coinciding virtual node being part of both the virtual representation and the sub-tree by traversing the virtual representation in an ascending manner starting in a cache node requesting the content. The implementation means 610 and the identifying means 630 is closely linked with the CPU 650 and may also be included in the CPU. The locator node 600 further includes a transmitter 620 for causing the requested content to be cached in a cache node by e.g. sending a proposal to the cache node.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. Method in a cache finding entity for finding content in a real network, the real network comprising a plurality of cache nodes comprising cached content and a plurality of intermediate nodes, the method comprising steps of:
implementing, by a central processing unit of the cache finding entity, a virtual representation of the real network, the virtual representation being a virtual, hierarchical topology with cache nodes corresponding to the cache nodes of the real network, said cache nodes being arranged at a first level in the hierarchical topology and with virtual nodes being arranged at higher levels in the hierarchical topology, wherein the virtual representation of the real network is implemented by using information of the cache nodes and path costs between the cache nodes in the real network and eliminating all intermediate nodes of the real network, reorganizing a structure of the real network comprising multiple paths between all of the cache nodes into the hierarchical topology where there exist only one path between any two cache nodes in the virtual representation and a path cost of this one path corresponds to a lowest path cost between corresponding cache nodes in the real network;
receiving, by a receiver of the cache finding entity, a request for a specific content;
identifying, by the central processing unit of the cache finding entity, a plurality of cache nodes in the network comprising the requested content; and
using, by the central processing unit of the cache finding entity, said virtual representation for finding a closest cache node comprising the requested content.

2. Method according to claim 1, wherein the step of finding the closest cache node comprising the requested content comprises the sub-steps of:
implementing a sub-tree in the virtual representation, the sub-tree consisting of the identified cache nodes comprising the requested content and the paths between these cache nodes; and
finding a coinciding virtual node being part of both the virtual representation and the sub-tree by traversing the virtual representation in an ascending manner starting in a cache node requesting the content.

3. Method according to claim 2, further comprising the following step:
traversing the sub-tree in a descending manner starting in the coinciding virtual node representation in order to find out a cost for retrieving content from cache nodes located in the same branch as the coinciding virtual node.

4. Method according to claim 2, further comprising the following step:
traversing the sub-tree in an ascending manner, starting in a cache node comprising the requested content, towards the coinciding virtual node in order to find out a cost for retrieving content from the cache node.

5. Method according to claim 2, further comprising the following step:
traversing the sub-tree in an ascending manner towards a root node, starting in the coinciding virtual node representation in order to find out a cost for retrieving content from cache nodes located in other branches of the sub-tree.

6. Method according to claim 1, further comprising the step of causing the requested content to be retrieved from the cache node having the lowest cost.

7. Method according to claim 6, further comprising the step of causing the requested content to be cached in the cache node requesting the content.

8. Method according to claim 1, wherein the virtual nodes in a second level is arranged to logically represent a number of cache nodes.

9. Method according to claim 8, further comprising the step of causing the requested content to be cached in any of the cache nodes represented by the virtual node that represents the cache node requesting the content.

10. Method according to claim 1, wherein said cache finding entity is a locator node.

11. Method in a management node for creating a virtual representation of a real network, the real network comprising a plurality of cache nodes comprising cached content and a plurality of intermediate nodes, the method comprising steps of:

receiving, by a receiver of the management node, a table having entries comprising information regarding path costs between said plurality of cache nodes;

creating, by a central processing unit of the management node, a virtual representation of the real network, the virtual representation being a hierarchical topology and with cache nodes corresponding to the cache nodes of the real network and the cache nodes being arranged at a first level in the hierarchical topology and with virtual nodes being arranged at higher levels in the hierarchical topology, wherein the virtual topology of the real network is created by using information of the cache nodes and the path costs between the cache nodes in the real network and eliminating all intermediate nodes of the real network, reorganizing a structure of the real network comprising multiple paths between all of the cache nodes into the hierarchical topology where there exist only one path between any two cache nodes in the hierarchical topology;

defining, by the central processing unit of the management node, virtual links between nodes in the hierarchical topology, such that there exist only one path between any two cache nodes in the hierarchical topology; and assigning, by a central processing unit of the management node, costs to the defined virtual links such that the path cost between said any two cache nodes in the hierarchical topology corresponds to the lowest path cost between corresponding any two cache nodes in the real network.

12. Method according to claim 11, wherein the difference between assigned costs in the virtual representation between any two cache nodes and the lowest path cost between corresponding any two cache nodes in the real network is minimized by performing the following steps for each pair of cache nodes:

summing the cost for all virtual links connecting two cache nodes to receive a summed path cost between the two cache nodes;

calculate the difference between the summed path cost and the lowest path cost between the two cache nodes; thereafter summing the difference of all path costs using a least squares method;

locating a minima to the difference of all path costs using a gradient search; and adding a value to the cost for each virtual link connecting nodes in the virtual representation, based on said calculated minima.

13. Method according to claim 11, wherein the virtual representation is in the form of a tree and the number of layers in the virtual representation depends on the difference between the assigned costs in the virtual representation between cache nodes and the lowest path cost in the real network between cache nodes.

14. Method according to claim 11, wherein the virtual representation is in the form of a tree and the number of layers in the virtual representation depends on at least one of the number of cache nodes and the difference in cost between the cache nodes.

15. Method according to claim 11, further comprising the step of:

transmitting the virtual representation to a cache finding entity for using said virtual representation to locate cache nodes.

16. Method according to claim 11, further comprising the step of:

defining a number of cache nodes to be logically represented by a virtual node based on the internal communication cost between the cache nodes.

17. Method according to claim 11, wherein at least one virtual node correspond to one or more intermediate nodes.

18. Node for finding content in a real network, the real network comprising a plurality of cache nodes comprising cached content and a plurality of intermediate nodes, the node comprising:

a central process unit configured to implement a virtual representation of the network, the virtual representation being a virtual, hierarchical topology with cache nodes corresponding to the cache nodes of the real network, said cache nodes being arranged at a first level in the hierarchical topology and with virtual nodes being arranged at higher levels in the hierarchical topology, wherein the virtual representation of the real network is implemented by using information of the cache nodes and path costs between the cache nodes in the real network and eliminating all intermediate nodes of the real network, reorganizing a structure of the real network comprising multiple paths between all of the cache nodes into the hierarchical topology where there exist only one path between any two cache nodes in the virtual representation and a path cost of this one path corresponds to a lowest path cost between corresponding cache nodes in the real network;

a memory configured to implement the virtual representation;

a receiver for receiving a request for a specific content;

the central processing unit further configured to identify a plurality of cache nodes in the real network comprising the requested content;

the central processing unit further configured to use said virtual representation for finding a closest cache node comprising the requested content.

19. Node according to claim 18, further comprising:

the central processing unit further configured to implement a sub-tree in the virtual representation, the sub-tree consisting of the identified cache nodes comprising the requested content and the paths between these cache nodes; and the central processing unit further configured to find a coinciding virtual node being part of both the virtual representation and the sub-tree by traversing the virtual representation in an ascending manner starting in a cache node requesting the content.

20. A management node configured to create a virtual representation of a real network, the real network comprising a plurality of cache nodes comprising cached content and a plurality of intermediate nodes, the management node comprising:

a receiver configured to receive a table having entries comprising information regarding path costs between said plurality of cache nodes;

a central processing unit configured to create a virtual representation of the real network, the virtual representation being a hierarchical topology and with cache nodes corresponding to the cache nodes of the real network and the cache nodes being arranged at a first level in the hierarchical topology and with virtual nodes being arranged at higher levels in the hierarchical topology, wherein the virtual topology of the real network is created by using information of the cache nodes and the path costs between the cache nodes in the real network and eliminating all intermediate nodes of the real network, reorganizing a structure of the real network comprising multiple paths between all of the cache nodes into the hierarchical topology where there exist only one path between any two cache nodes in the hierarchical topology;

the central processing unit further configured to define virtual links between nodes in the hierarchical topology, such that there exist only one path between any two cache nodes in the hierarchical topology; and the central processing unit further configured to assign costs to the defined virtual links such that the path cost between said any two cache nodes in the hierarchical topology corresponds to the lowest path cost between corresponding any two cache nodes in the real network.

21. A content delivery network configured to support multimedia services, the content delivery network comprising:

a management node configured to create a virtual representation of a real network, the real network comprising a plurality of cache nodes comprising cached content and a plurality of intermediate nodes, the management node comprises:

a receiver configured to receive a table having entries comprising information regarding path costs between said plurality of cache nodes;

a central processing unit configured to create a virtual representation of the real network, the virtual representation being a hierarchical topology and with cache nodes corresponding to the cache nodes of the real network and the cache nodes being arranged at a first level in the hierarchical topology and with virtual nodes being arranged at higher levels in the hierarchical topology, wherein the virtual topology of the real network is created by using information of the cache nodes and the path costs between the cache nodes in the real network and eliminating all intermediate nodes of the real network, reorganizing a structure of the real network comprising multiple paths between all of the cache nodes into the hierarchical topology where there exist only one path between any two cache nodes in the hierarchical topology;

the central processing unit further configured to define virtual links between nodes in the hierarchical topology, such that there exist only one path between any two cache nodes in the hierarchical topology; and the central processing unit further configured to assign costs to the defined virtual links such that the path cost between said any two cache nodes in the hierarchical topology corresponds to the lowest path cost between corresponding any two cache nodes in the real network; and a cache finding entity configured to find content in the real network, the cache finding entity comprising:

a receiver configured to receive a request for a specific content;

a central processing unit configured to identify a plurality of cache nodes in the network comprising the requested content; and the central processing unit configured to obtain and implement the virtual representation of the real network for finding a closest cache node comprising the requested content.

* * * * *